(12) United States Patent  
Kim

(10) Patent No.: US 6,226,157 B1  
(45) Date of Patent: May 1, 2001

(54) SEPARABLE ARM ACTUATOR FOR HARD DISK DRIVE

(75) Inventor: Myung-Il Kim, Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/075,322

(22) Filed: May 11, 1998

(30) Foreign Application Priority Data

May 23, 1997 (KR) .................................................. 97-20349

(51) Int. Cl.[7] ...................................................... G11B 5/50
(52) U.S. Cl. ...................................... 360/266.1; 360/244.5
(58) Field of Search .................................... 360/104, 106, 360/109, 244.5, 245.2, 265.7, 265.9, 266, 266.1

(56) References Cited

U.S. PATENT DOCUMENTS

| | | | |
|---|---|---|---|
| 4,716,478 | * 12/1987 | Walsh et al. | ........................... 360/104 |
| 4,835,641 | 5/1989 | Maeda | .................................. 360/104 |
| 4,879,617 | 11/1989 | Sampietro et al. | ................... 360/106 |
| 4,912,583 | 3/1990 | Hinlein | .................................. 360/104 |
| 5,095,396 | 3/1992 | Putnam et al. | ....................... 360/106 |
| 5,109,310 | * 4/1992 | Ohkjita et al. | ........................ 360/106 |
| 5,153,794 | 10/1992 | Hinlein | .................................. 360/104 |
| 5,296,984 | 3/1994 | Fick | ....................................... 360/104 |
| 5,305,169 | * 4/1994 | Anderson et al. | .................... 360/105 |
| 5,323,284 | 6/1994 | Pecha et al. | ........................... 360/104 |
| 5,404,636 | * 4/1995 | Stefansky et al. | ................. 29/603.03 |
| 5,491,599 | 2/1996 | Sogabe | ................................... 360/106 |
| 5,495,375 | * 2/1996 | Baasch et al. | ........................ 360/104 |
| 5,691,581 | * 11/1997 | Umehara et al. | ................ 360/104 X |
| 5,805,377 | * 9/1998 | Lerdal et al. | ..................... 360/104 X |
| 5,828,521 | * 10/1998 | Hasegawa | ............................ 360/104 |
| 5,854,721 | * 12/1998 | Lim | .................................. 360/104 X |

* cited by examiner

*Primary Examiner*—David L. Ometz  
*Assistant Examiner*—Angel Castro  
(74) *Attorney, Agent, or Firm*—Robert E. Bushnell, Esq.

(57) ABSTRACT

An actuator for a hard disk drive has a separable assembled arm. The assembled arm is assembled adjacent to the actuator to add an additional head or heads to a basic actuator for including of arms having two or four heads, thereby allowing a large drive to be realized having a large number of arms and disks.

7 Claims, 4 Drawing Sheets

SEPARABLE ARM ACTUATOR FOR HARD DISK DRIVE

CLAIM OF PRIORITY

This application makes reference to, incorporates the same herein, and claims all benefits accruing under 35 U.S.C. § 119 from an application for ACTUATOR IN HARD DISK DRIVE earlier filed in the Korean Industrial Property Office on the 23$^{rd}$ of May 1997 and there duly assigned Ser. No. 20349/1997.

BACKGROUND OF THE INVENTION

1. Field of the Invention

The present invention relates to an actuator for a hard disk drive, and in particular, to an actuator of which the arm, assembled around a pivot shaft in a hard disk drive, is made separable to allow the number of arms and number of heads attached to the arms to be increased according to the capacity of the drive.

2. Description of the Related Art

A hard disk drive is used as an auxiliary memory device for a computer, for recording or reading information on or from a disk having a magnetic medium by a magnetic head. The hard disk drive generally has a frame including a base, a cover, and so on, a spindle motor for supporting and rotating the disk, the magnetic head for recording and reproducing data, an actuator for controlling the position of the magnetic head by a voice coil motor (VCM), a circuit for controlling the driving devices and performing electrical process 2D, and an interface for connecting the drive to a body. Such a hard disk drive is comprised of electronic and mechanical devices, for recording and reproducing data by converting digital electrical pulses into a magnetic field.

The disk in the hard disk drive fixedly rotates around the spindle motor at a high speed. The magnetic head moves over the disk at a very small height due to an air flow generated on a disk surface by the rotation of the disk. The magnetic head is fixed to a head gimbals at the tip of an arm of the actuator for rotating by the VCM, and moves to a target track for a data search to thereby perform read/write operations.

The actuator is rotatably installed around a pivot shaft, and has a bobbin in an end portion thereof. The bobbin moves by operation of the VCM and then the magnetic head installed in the other end portion of the actuator records or reads data on or from a track of the disk. When the hard disk drive stops or the power is off, the actuator moves to a parking zone located on an inner track of the disk to prevent damage to the disk.

The actuator conventionally has three or four arms. When all of the arms are not used, for example, two or three arms are used to stack heads, dummy heads are applied to the other unused arms, thus increasing the weight of the actuator and adversely influencing drive performance. Addition, even if all the arms, for example, four arms are used, a single Pivot Shaft passes through four arm holes to stack heads on the arms. Thus, the arms are highly susceptible to warpage due to the impact of the Pivot Shaft. Furthermore, since the arms are weaker than the Pivot Shaft, cracks are produced around the arm hole, in many cases.

On the other hand, in the case of assembled arms, the four arms can be assembled, with a Pivot Shaft passing through a single hole, minimizing the failure of each arm. The current trend of a hard disk drive is to derive several side models from a basic model due to a short life cycle, so that drastically changing world's demands are rapidly satisfied and a drive having an optimum structure is timely provided for user demands.

The following patents each disclose features in common with the present invention but do not teach or suggest the separable arm actuator for a hard disk drive of the present invention: U.S. Pat. No. 5,153,794 to Hinlein, entitled *Assembly And Method For Securing Head Suspensions On Actuator Arms*, U.S. Pat. No. 5,323,284 to Pecha et al., entitled *Magnetic Transducer Receiver For A Disk Drive*, U.S. Pat. No. 4,835,641 to Maeda, entitled *Magnetic Disk Apparatus*, U.S. Pat. No. 5,095,396 to Putnam et al., entitled *Unitary E-Block Assembly For Use In A Disk Drive*, U.S. Pat. No. 4,879,617 to Sampietro et al., entitled *Actuator Assembly For Hard Disk Drives*, U.S. Pat. No. 5,296,984 to Fick, entitled *Adapter Plate For Coupling A Head To An Actuator Arm In A Disk Drive Assembly*, U.S. Pat. No. 4,912,583 to Hinlein, entitled *Clamp For Mounting Head-Load Beam Slider Arm In A Disk Drive*, and U.S. Pat. No. 5,491,599 to Sogabe, entitled *Magnetic Disk Apparatus*.

SUMMARY OF THE INVENTION

An object of the present invention is to provide an actuator for moving a head over a recording medium in a hard disk drive, of which the arm is made separable, so that the performance of the drive is increased by reducing unnecessary parts and the weight of the actuator.

Another object of the present invention is to provide an actuator which is so in expensive and easily replaced as to reduce parts in developing several side models from a basic model, and which is lightweight, thereby increasing drive performance and decreasing seek time.

To achieve the above objects, there is provided an actuator for a hard disk drive. The actuator has a separable arm. The separable arm is assembled adjacent the actuator to add an additional head or heads to an actuator having two or four heads; and thereby allowing a large drive.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
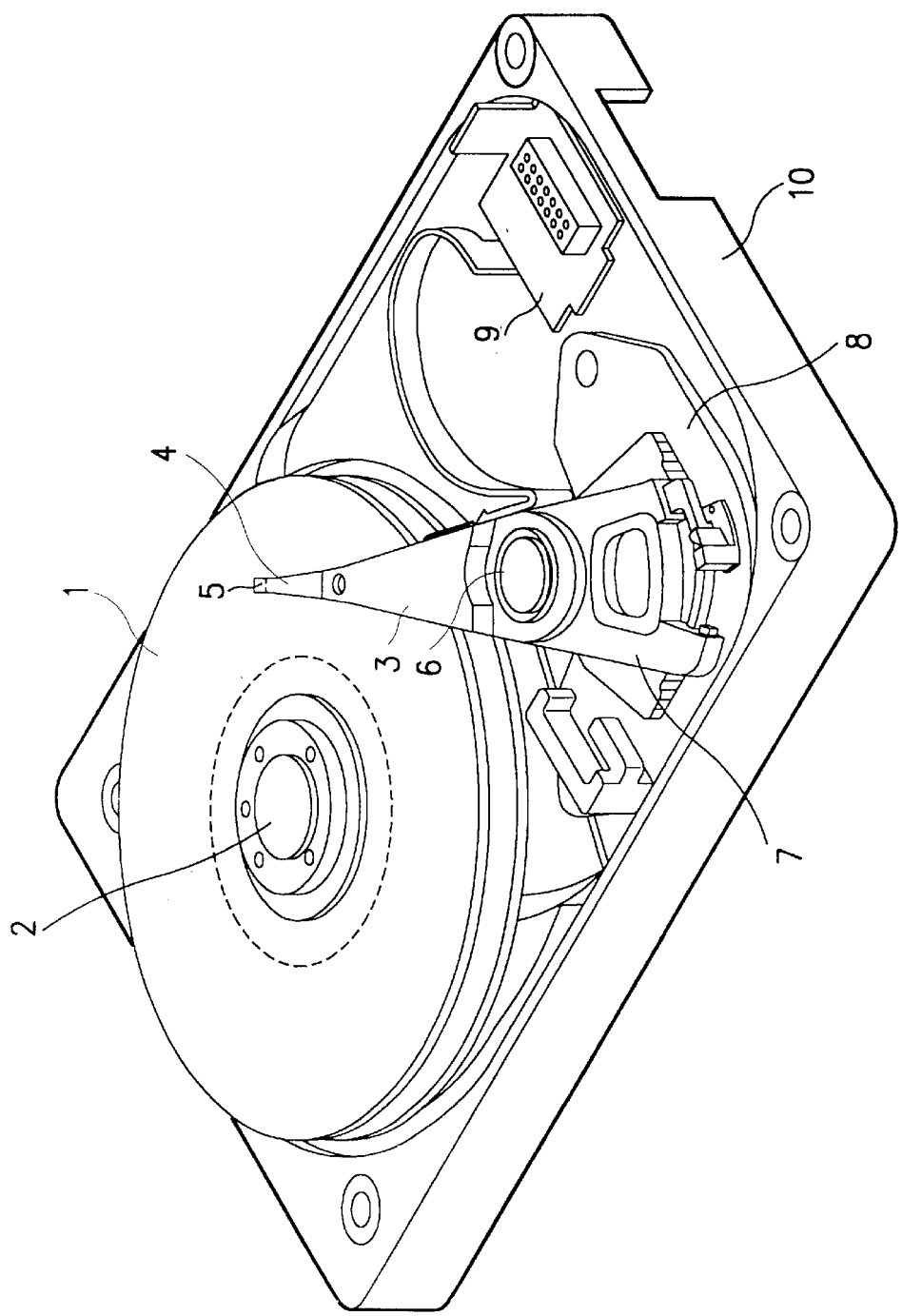
FIG. 1 schematically illustrates a hard disk drive.

FIG. 1 illustrates a hard disk drive used as an auxiliary memory for a computer, for recording or reading information on or from a disk 1 having a magnetic medium by a magnetic head 5. The hard disk generally has a frame 10 including a base, a cover, and spindle motor 2 for supporting and rotating the disk 1, the magnetic head 5 recording and reproducing data, an actuator 3 for controlling the position of the magnetic head 5 by a voice coil motor 8, and a circuit 9 for controlling the driving devices and performing an electrical processes.

Figure 2:
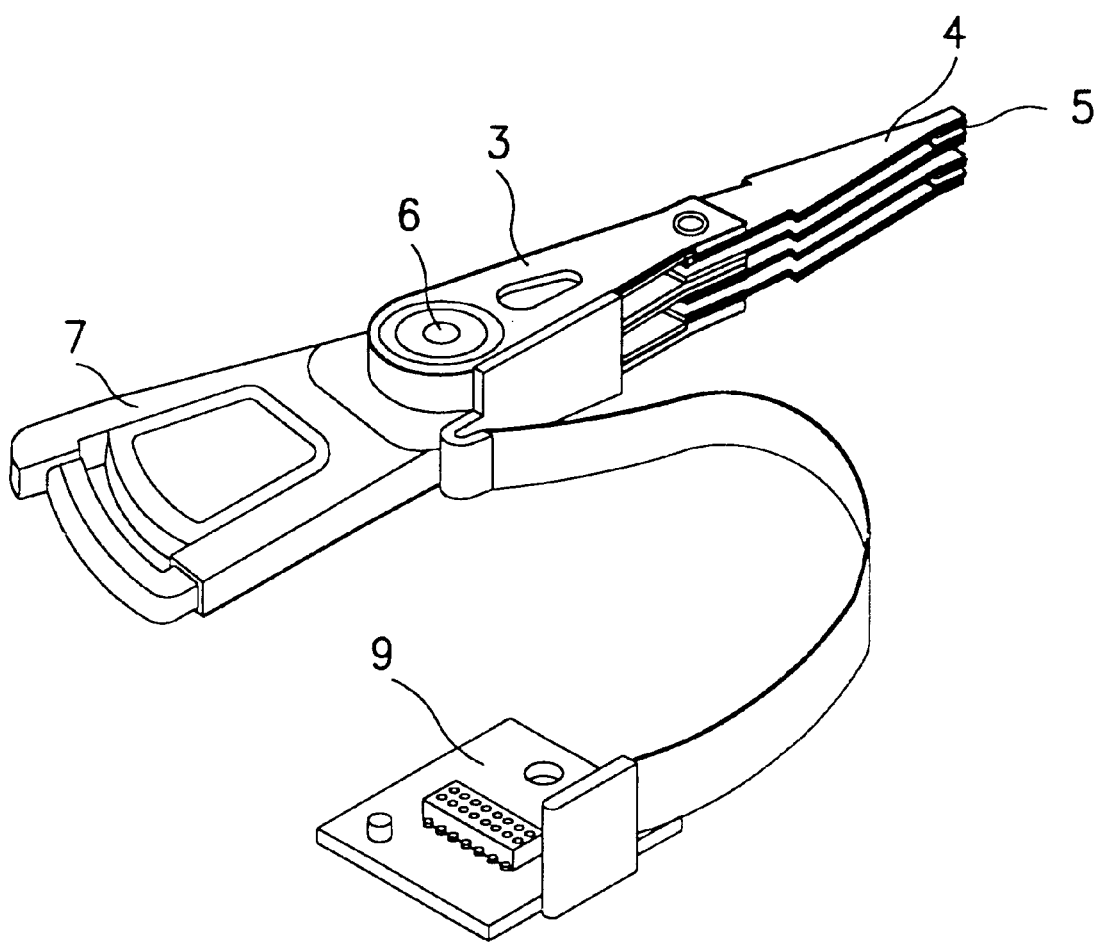
FIG. 2 is a perspective view of an actuator.

FIG. 2 is a perspective view of the actuator of FIG. 1, illustrating the pivot shaft 6, the bobbin 7, the actuator 3, the gimbals 4, the magnetic head 5, and the circuit board 9.

An actuator in an embodiment of the present invention allows a new four through six-head drive to be developed from a basic two-head drive by adding an arm having stacked heads.

Figure 3:
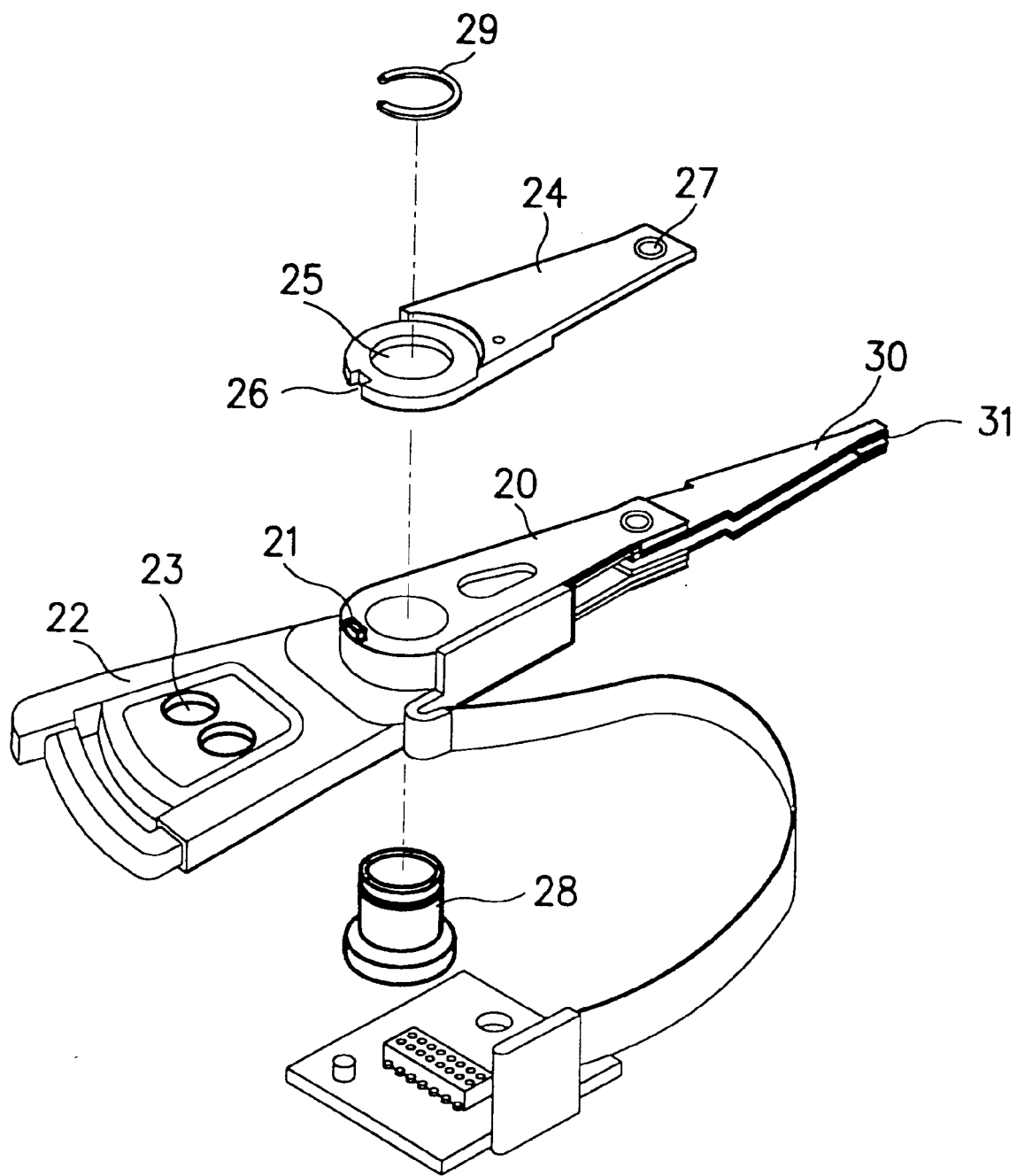
FIG. 3 schematically illustrates arms assembled independently of an actuator according to the present invention.

As shown in FIG. 3, a separable arm 24 is assembled on or under, that is, adjacent to an actuator 20 to add an additional head or heads to an actuator having basically two or four heads, thus enabling an additional head or heads to an actuator.

That is, the additional arm 24, which is to be assembled to the actuator 20 having two magnetic heads 31, has a hole 25 through which with a pivot bearing 28 is disposed, a position fixing groove 26 at an end portion of the arm 24, and an assembly hole 27 at the other end portion of the arm 24, to allow a head gimbal 30 to be attached thereto. A fixing protrusion 21 protrudes upward from the actuator 20, and is firmly disposed within the position fixing groove 26 to prevent side movement of the arm 24. A bobbin 22 of the actuator 20 has bobbin holes 23 actuator with the additional arm 24 by adding to lead inserted into the bobbin holes 23. Both the fixing protrusion 21 and the position fixing groove 26 are square shaped.

Figure 4:
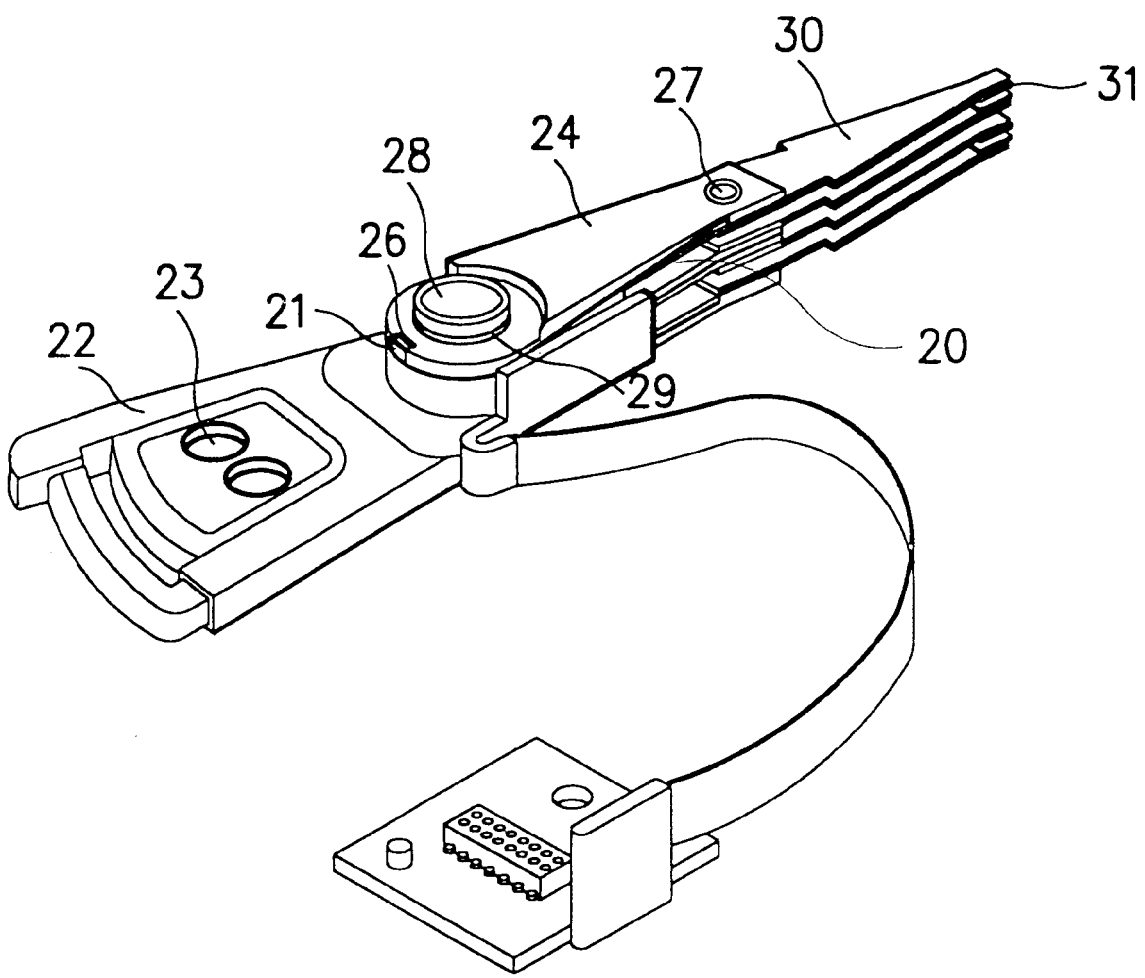
FIG. 4 schematically illustrates the arms completely assembled with the actuator according to the present invention.

To fix the assembled arm 24 to the two-head actuator 20, the actuator 20 and then the arm 24 are inserted into the pivot bearing 28, as shown in FIG. 4, with the fixing protrusion 21 inserted into the position fixing groove 26. A retainer ring 29 is finally attached to an upper portion of the pivot bearing 28.

In this state, lead is inserted into the bobbin holes 23 in order to balance the front and rear portions of the actuator 20 with the added arm.

Since the arm 24 is inserted into the pivot bearing 28 and the retainer ring 29 is installed on the arm 24, upward and downward oscillation of the arm 24 is prevented. Further, the side movement of the arm 24 is prevented by inserting the fixing protrusion 21 into the position fixing groove 26 clip.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An actuator for a hard disk drive, comprising:
   a fixing protrusion extending axially outwardly from said actuator;
   a bearing pivotally supporting laid actuator;
   an arm separately installed on the actuator and comprising:
      a first circular aperture through said arm forming a rim having a peripheral boundary defining a first end of said arm, said first circular aperture receiving said pivot bearing supporting said arm in a coaxial mounting with said actuator;
      a rectangular position fixing groove positioned at an end portion of said first end of said arm, forming a recess concavely set into said peripheral boundary and matingly conforming in shape to and receiving said fixing protrusion of the actuator while maintaining said arm in radial alignment with said actuator by preventing rotation of said arm relative to the actuator; and
      another aperture positioned at another and diametrically opposite end portion of a second end of the arm, allowing a head gimbal to be attached to said arm.

2. An actuator for a hard disk drive, comprising:
   a bobbin disposed in an end portion of said actuator;
   a first arm having a first head positioned radially opposite from said end portion;
   a second arm adding another head to said actuator;
   a pivot shaft passing coaxially through respective circular apertures in said first and second arms;
   said second arm being disposed adjacent said fist arm of the actuator, the second arm being attached to the first arm of said actuator by said pivot shaft passing through the respective circular apertures in the first and second arms;
   a rectangular fixing protrusion extending axially from the actuator; and
   a matingly sized position fixing groove concavely formed in a peripheral boundary of said second arm, positioned diametrically opposite said other head and mating with the rectangular fixing protrusion and preventing movement of said second arm with respect to said first arm.

3. An actuator for a hard disk drive as claimed in claim 2, the rectangular fixing protrusion and the position fixing groove being square shaped.

4. An actuator for a hard disk drive as claimed in claim 2, a bobbin aperture being formed in the bobbin, for inserting a weight for balancing the actuator.

5. An actuator comprising at least one arm for supporting a head mounted to a head gimbal for accessing a hard disk of a hard disk drive, the actuator further comprising:
   an aperture through which a pivot bearing is disposed;
   a rectangular fixing protrusion extending vertically upward from the actuator adjacent to said aperture and disposed on a distal end of said actuator diametrically opposite said head;
   a second arm detachably mounted to said actuator, said second arm having a second aperture through which said pivot is disposed, and a third aperture for enabling a second head gimbal to be attached to said second arm;
   a notch formed in an end portion of said second arm adjacent said second aperture, said notch being matingly connected to said rectangular fixing protrusion for preventing side movement of said second arm relative to the actuator; and
   a retaining ring mounted on said pivot bearing for securing said second arm to said actuator.

6. The actuator as set forth in claim 5, wherein said fixing protrusion is square shaped.

7. The actuator as set forth in claim 5, further comprising a bobbin responsive to a voice coil motor, said bobbin being attached to said distal end of said actuator and comprising a bobbin aperture for receiving a weight to enable said actuator to be balanced.

* * * * *